(12) United States Patent
Skaggs

(10) Patent No.: US 12,539,152 B2
(45) Date of Patent: Feb. 3, 2026

(54) PEDIATRIC LONG BONE FIXATION DEVICE

(71) Applicant: Children's Hospital Los Angeles, Los Angeles, CA (US)

(72) Inventor: David Skaggs, Los Angeles, CA (US)

(73) Assignee: Children's Hospital Los Angeles, Los Angeles, CA (US)

( * ) Notice: Subject to any disclaimer, the term of this patent is extended or adjusted under 35 U.S.C. 154(b) by 374 days.

(21) Appl. No.: 18/019,556

(22) PCT Filed: Aug. 5, 2021

(86) PCT No.: PCT/US2021/044592
§ 371 (c)(1),
(2) Date: Feb. 3, 2023

(87) PCT Pub. No.: WO2022/031881
PCT Pub. Date: Feb. 10, 2022

(65) Prior Publication Data
US 2023/0310045 A1 Oct. 5, 2023

Related U.S. Application Data

(60) Provisional application No. 63/061,461, filed on Aug. 5, 2020.

(51) Int. Cl.
*A61B 17/80* (2006.01)
*A61B 17/56* (2006.01)
*A61B 17/68* (2006.01)

(52) U.S. Cl.
CPC .......... *A61B 17/8014* (2013.01); *A61B 17/56* (2013.01); *A61B 17/8061* (2013.01); *A61B 2017/564* (2013.01); *A61B 2017/681* (2013.01)

(58) Field of Classification Search
CPC .............. A61B 17/56; A61B 2017/564; A61B 2017/681; A61B 17/8004; A61B 17/8014; A61B 17/8061
See application file for complete search history.

(56) References Cited

U.S. PATENT DOCUMENTS

| 3,779,240 A  * | 12/1973 | Kondo ............... A61B 17/8014 |
| | | 606/282 |
| 10,226,287 B2 * | 3/2019 | Langford ........... A61B 17/1728 |
| 2007/0016205 A1 | 1/2007 | Beutter et al. |
| 2015/0272638 A1 | 10/2015 | Langford |

FOREIGN PATENT DOCUMENTS

| CN | 104055568 A | 9/2014 |
| KR | 20130018646 A | 2/2013 |
| WO | 2017215896 A1 | 12/2017 |

OTHER PUBLICATIONS

"International Search Report and Written Opinion Received mailed Nov. 22, 2021", 10 pages.

* cited by examiner

*Primary Examiner* — Larry E Waggle, Jr.
(74) *Attorney, Agent, or Firm* — Billion & Armitage

(57) ABSTRACT

Methods and devices for applying a compressive force to a growth plate in a long bone of a pediatric patient. A dynamically compressive bone plate is provided for applying the compressive force to the growth plate of the long bone. By applying compressive force to the growth plate in the long bone, the activity of the growth plate is suppressed, inactivated, or otherwise shut down.

7 Claims, 6 Drawing Sheets

PEDIATRIC LONG BONE FIXATION DEVICE

BACKGROUND

In the growing skeleton, shutting down or inactivating a growth plate is often performed for two reasons. The first being correcting an angular deformity, which can be done by shutting down growth on one side of a growth plate but allowing the other side to grow thereby leading to angular growth. The second reason is stopping growth completely.

Improved devices and methods for growth guidance surgery are needed.

SUMMARY OF THE INVENTION

The present invention is directed towards long bone fixation devices and methods of using those devices. In some embodiments, the present invention is directed towards methods of applying a compressive force against a growth plate in the long bone of a patient to suppress, inactivate, or otherwise shut down the activity of the growth plate. In further embodiments, the present invention is directed towards bone plates specifically designed to apply a compressive force against a growth plate in a long bone of a patient to modify, retard, or halt the activity of the growth plate and retard or halt the growth of the long bone In some embodiments the present invention includes methods of suppressing a growth plate in a long bone of a patient. The methods can include providing a bone plate having a longitudinal axis and including an upper surface and a lower surface, wherein the lower surface is configured to contact bone. The bone plate has a proximal end and a distal end at opposite ends of the longitudinal axis. The bone plate also has a first oblong screw hole defined in the proximal end, wherein the first oblong screw hole has a narrower end and a wider end and the narrower end is closer to the proximal end than the wider end of the first oblong screw hole. The bone plate also has a second oblong screw hole defined in the distal end, wherein the second oblong screw hole has a narrower end and a wider end and the narrower end is closer to the distal end than the wider end of the second oblong screw hole. The bone plate is positioned against the long bone of the patient, wherein the first oblong screw hole is positioned proximal of the growth plate and the second oblong screw hole is positioned distal of the growth plate. The bone plate is fixed to the long bone, wherein fixing the bone plate includes directing a first bone screw through the first oblong hole and into the long bone and tightening the first bone screw against the bone plate and fixing the bone plate includes directing a second bone screw through the second oblong hole and into the long bone and tightening the second bone screw against the bone plate. Tightening the first and second bones screws against the bone plate places a compressive force on the growth plate which suppresses the function of the growth plate.

In further embodiments, the present invention includes pediatric bone plates having a longitudinal axis and comprising an upper surface and a lower surface, wherein the lower surface is configured to contact bone; a proximal end and a distal end at opposite ends of the longitudinal axis; a first oblong screw hole defined in the proximal end, wherein the first oblong screw hole has a narrower end and a wider end and the narrower end is closer to the proximal end than the wider end of the first oblong screw hole; and a second oblong screw hole defined in the distal end, wherein the second oblong screw hole has a narrower end and a wider end and the narrower end is closer to the distal end than the wider end of the second oblong screw hole.

DETAILED DESCRIPTION

The present disclosure includes a long bone fixation device and methods of using the device. The present invention provides for growth guidance surgery that is much less invasive, painful, and complication-ridden than prior art procedures that involve cutting bones. Further, the present invention provides for growth guidance surgery that can produce better outcomes in pediatric patients that are approaching the end of their normal growth phase (e.g., patients that are in late adolescence). Prior art procedures are sometimes not helpful for such patients because the amount of further bone growth from their growth plate is insufficient to achieve a desired magnitude of correction. Still further, the present invention provides implants and methods that provide for reduced time for growth plate inactivation. In particular, the disclosed device can be used to place the growth plate under immediate compression, such as during surgery, to reduce the time for the plate to inactivate.

Figure 1:
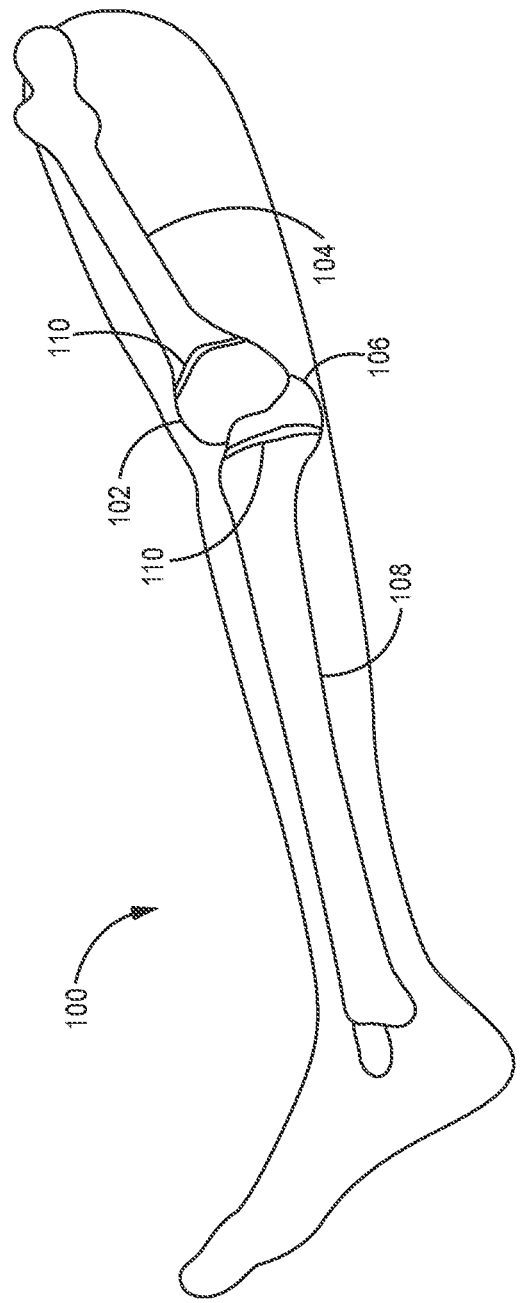
FIG. 1 provides a partially translucent perspective view from the medial side of a right leg of a pediatric patient.

FIG. 1 provides a partially translucent perspective view from the medial side of right leg 100 of a pediatric patient. Shown are two long bones, including distal end 102 of femur 104 and proximal end 106 of tibia 108. Distal end 102 and proximal end 106 includes growth plates 110 (also referred to as physis or epiphyseal plates).

Figure 2:
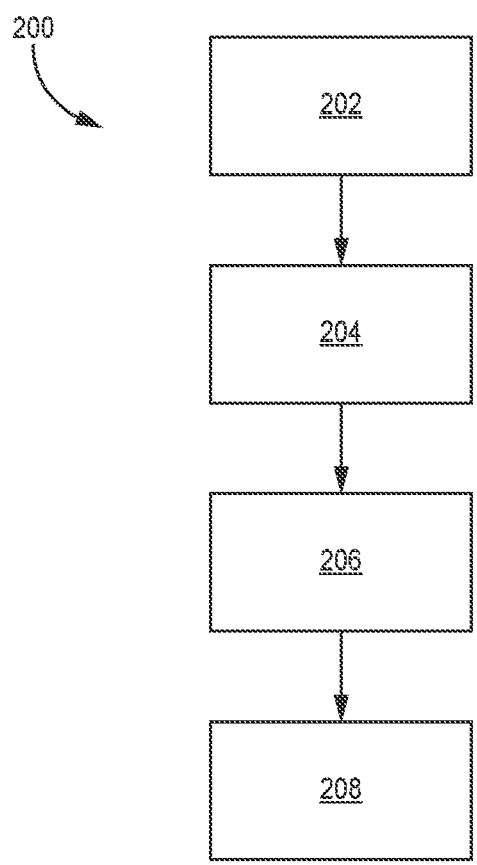
FIG. 2 illustrates a flow chart of a method of the invention.

The present invention includes a method of suppressing a growth plate in a long bone of a patient. FIG. 2 illustrates a flow chart of the inventive methods in the form of process 200. Process 200 includes step 202 which includes providing a bone plate. Example bone plates include bone plate 300 shown in FIGS. 3A and 3B and bone plate 400 shown in FIG. 4.

Figure 3A:
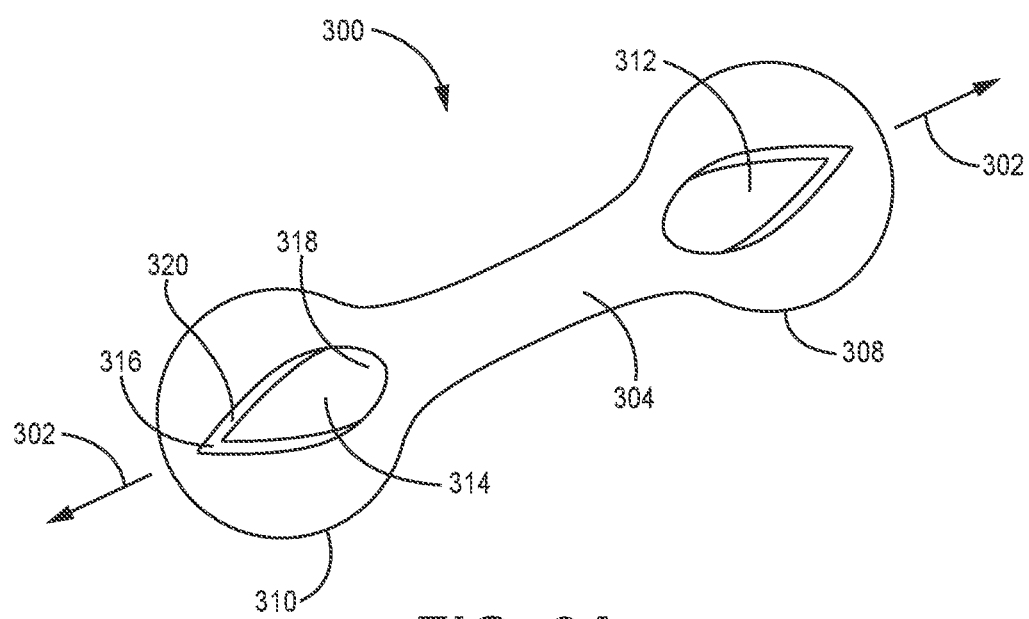
FIG. 3A illustrates a top view of a bone plate of the invention.
Figure 3B:
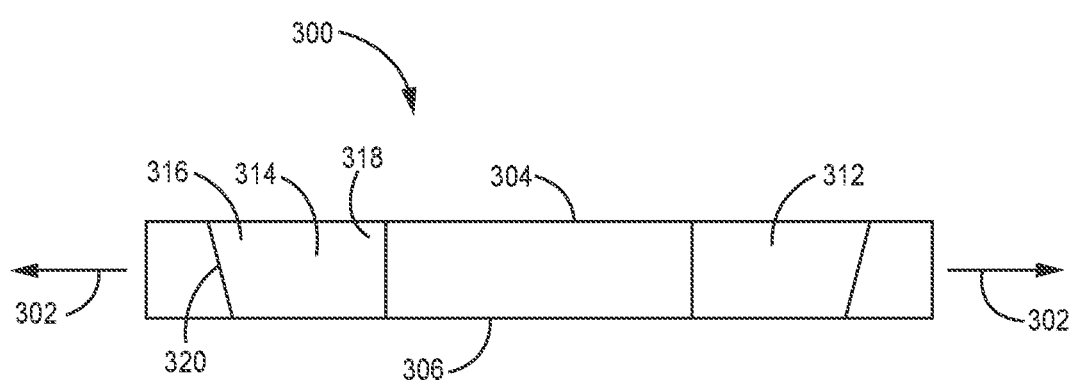
FIG. 3B illustrates a side cut-away view of a bone plate of the invention.

FIG. 3A illustrates a top view of bone plate 300, while FIG. 3B illustrates a side cut-away view of bone plate 300 along longitudinal axis 302.

Bone plate 300 is a generally rectangular plate with major longitudinal axis 302. Bone plate 300 includes upper surface 304 and lower surface 306. Lower surface 306 is configured to contact bone. Bone plate 300 also includes proximal end 308 opposite distal end 310, both along major longitudinal axis 302.

Bone plate 300 defines a hole in each of proximal end 308 and distal end 310 which is configured to receive a bone anchor (e.g., a bone screw). First screw hole 312 in proximal end 308 and second screw hole 314 in distal end 310 have an oblong tear-shaped profile which allows bone plate 300 to function as a dynamic compression bone plate when the head of a bone screw is tightened against plate 300. Second screw hole 314, for example, has narrower end 316 and wider end 318. Narrower end 316 has a conical shape such that the side wall of second screw hole 314 has a slope 320. When a bone screw is tightened against the plate, narrower end 316 will press against the head of the bone screw and urge the plate along longitudinal axis 302 so that the head of the bone screw is driven towards wider end 318. First screw hole 312 has a similar design to urge the head of a bone screw towards its wider end.

Figure 4:
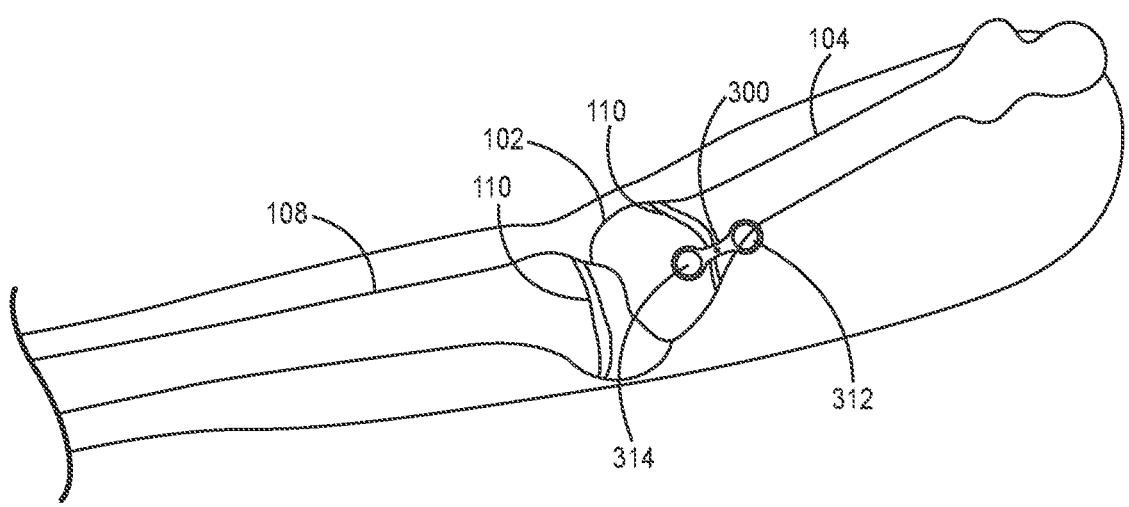
FIG. 4 illustrates a partially translucent perspective view of a bone plate of the invention after it has been placed against a long bone.

Process 200 includes step 204 which includes positioning the bone plate against the long bone of the patient, wherein the first oblong screw hole is positioned proximal of the growth plate and the second oblong screw hole is positioned distal of the growth plate. FIG. 4 illustrates a partially translucent perspective view of bone plate 300 after it has been placed against femur 104. First screw hole 312 is proximal of growth plate 110 on femur 104, while second screw hole 314 is distal of growth plate 110.

Process 200 includes step 206 which includes fixing the bone plate to the long bone, wherein fixing the bone plate includes directing a first bone screw through the first oblong hole and a second bone screw through the second oblong hole, such that the bone screws are directed into the long bone and tightened against the bone plate. Tightening the bone screws against the bone plate places a compressive force on the growth plate.

Process 200 includes step 208, which includes suppressing or inactivating the growth plate such that it no longer provides growth to the long bone. The compressive force provided by the bone plate when the bone screws were tightened retards or suppresses the activity of the growth plate.

Figure 5:
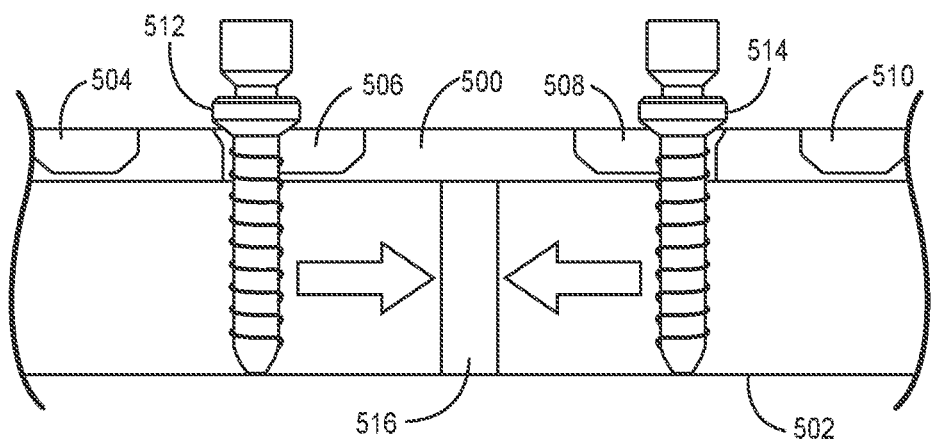
FIG. 5 illustrates a side cut-away view of a bone plate of the invention.

FIG. 5 illustrates a side cut-away view of a bone plate of the invention, in the form of bone plate 500 after it has been positioned against long bone 502. Bone plate 500 includes four bone screw holes, including hole 504, hole 506, hole 508, and hole 510. Bone screw 512 has been directed through hole 506 and into long bone 502. Bone screw 514 has been directed through hole 508 and into long bone 502 as well, though on the opposite side of growth plate 516. Bone screws 512 and 514 have also been tightened against bone plate 500 and the oblong shape of holes 506 and 508 are pressing against the heads of screws 512 and 514. This pressure between plate 500 and screws 512 and 514 generates a compressive force in long bone 502 on either side of growth plate 516, pressing against growth plate 516. This pressure on growth plate 516 will retard, suppress, or otherwise inactivate the function of growth plate 516.

In some embodiments, the bone plates and methods are applied to a long bone of a pediatric patient.

In some embodiments, one or more of the oblong screw holes in the plates of the invention includes threads configured to engage with the head of a bone screw. The threads may extend around all or a portion of the perimeter or the oblong screw hole.

What is claimed is:

1. A method of suppressing a growth plate in a long bone of a patient, the method comprising:
    providing a bone plate having a longitudinal axis and including
        an upper surface and a lower surface, wherein the lower surface is configured to contact bone,
        a proximal end and a distal end at opposite ends of the longitudinal axis;
        a first oblong screw hole defined in the proximal end, wherein the first oblong screw hole has a narrower end and a wider end and the narrower end is closer to the proximal end than the wider end of the first oblong screw hole; and
        a second oblong screw hole defined in the distal end, wherein the second oblong screw hole has a narrower end and a wider end and the narrower end is closer to the distal end than the wider end of the second oblong screw hole;
    positioning the bone plate against the long bone of the patient, wherein the first oblong screw hole is positioned proximal of the growth plate and the second oblong screw hole is positioned distal of the growth plate; and
    fixing the bone plate to the long bone, wherein fixing the bone plate includes directing a first bone screw through the first oblong hole and into the long bone and tightening the first bone screw against the bone plate and fixing the bone plate includes directing a second bone screw through the second oblong hole and into the long bone and tightening the second bone screw against the bone plate, and wherein tightening the first and second bones screws against the bone plate places a compressive force on the growth plate which suppresses the growth plate.

2. The method of claim 1, wherein the patient is a pediatric patient.

3. The method of claim 1, wherein the bone plate includes a third screw hole and a fourth screw hole.

4. The method of claim 1, wherein the wider end of the first oblong screw hole includes threads configured to engage with the first bone screw.

5. The method of claim 1, wherein both the first oblong screw hole and the second oblong screw hole have conical sides walls that cause the first and second bone screws to exert axial forces on the long bone as the first and second bone screws are directed into the long bone and tightened against the bone plate.

6. The method of claim 1, wherein the first oblong screw hole and the second oblong screw hole each have a teardrop shape.

7. The method of claim 1, further including providing a second bone plate and positioning the second bone plate on an opposite side of the long bone, wherein the second bone plate places a compressive force on the growth plate.

* * * * *